く12) United States Patent
Tanir et al.

(10) Patent No.: US 7,475,980 B2
(45) Date of Patent: Jan. 13, 2009

(54) SPECTACLE KIT

(76) Inventors: Erol Ralph Tanir, Spexxworld Limited, Unit 1, Oaksey Road, Poole Keynes, Cirencester (GB) G17 6EA; Paul Davey Sinding, Spexxworld Limited, Unit 1, Oaksey Road, Poole Keynes, Cirencester (GB) G17 6EA ( * ) Notice: Subject to any disclaimer, the term of this patent is extended or adjusted under 35 U.S.C. 154(b) by 88 days.

(21) Appl. No.: 10/523,222

(22) PCT Filed: Aug. 1, 2003
(Under 37 CFR 1.47)

(86) PCT No.: PCT/GB03/03355

§ 371 (c)(1),
(2), (4) Date: Jan. 20, 2006

(87) PCT Pub. No.: WO2004/013678

PCT Pub. Date: Feb. 12, 2004

(65) Prior Publication Data

US 2007/0091254 A1    Apr. 26, 2007

(30) Foreign Application Priority Data

Aug. 1, 2002    (GB)    ................... 0217834.1

(51) Int. Cl.
*G02C 5/00*    (2006.01)
*G02C 7/10*    (2006.01)

(52) U.S. Cl. ............................. 351/41; 351/44; 351/46; 351/51

(58) Field of Classification Search ................... 351/41, 351/44, 46, 51, 52, 154, 159; 2/12, 15, 426
See application file for complete search history.

(56) References Cited

U.S. PATENT DOCUMENTS

| 1,182,398 | A | * | 5/1916 | Malcom | ........................... 2/12 |
| 1,270,640 | A | * | 6/1918 | Markham | ...................... 2/433 |
| 4,810,080 | A | | 3/1989 | Grendol et al. | |
| 4,868,930 | A | * | 9/1989 | Blackstone | .................... 2/439 |
| 4,955,709 | A | | 9/1990 | Smith | |
| 5,140,710 | A | * | 8/1992 | Rademacher | .................. 2/432 |
| 5,189,447 | A | | 2/1993 | Oleson | |
| 5,661,536 | A | | 8/1997 | Conway | |
| 5,825,452 | A | | 10/1998 | Spector | |
| 5,825,542 | A | | 10/1998 | Cobb, Jr. et al. | |

FOREIGN PATENT DOCUMENTS

EP    0 410 027 A1    1/1991
GB    684407    12/1952

* cited by examiner

*Primary Examiner*—Huy K Mai
(74) *Attorney, Agent, or Firm*—Buckley, Maschoff & Talwalkar LLC

(57) ABSTRACT

A spectacle kit includes a pair of lenses made from flexible material joined by a nose bridge portion and a pair of side arms. Each lens has an outer upper portion and an outer lower portion which move towards one another to overlap and form a convex portion in each lens.

23 Claims, 21 Drawing Sheets

Fig 10
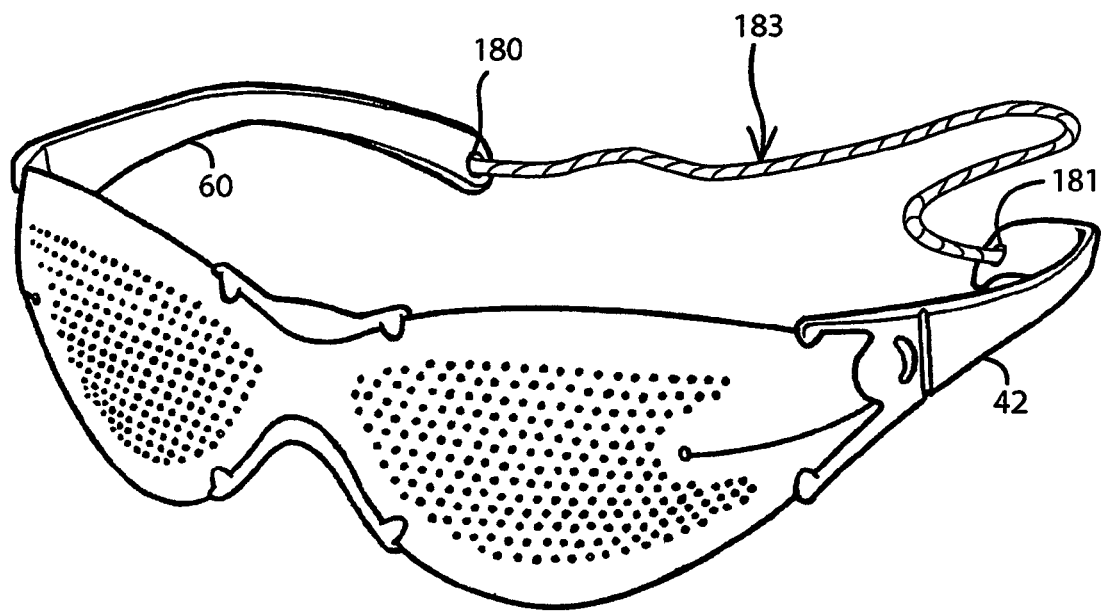
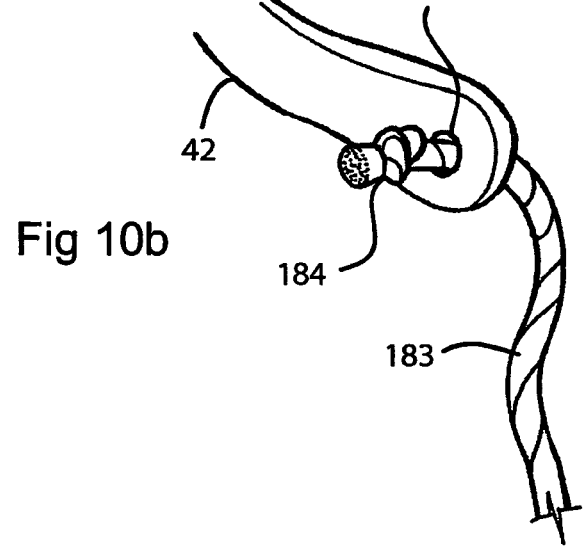
Fig 10b

Fig 18
Fig 19
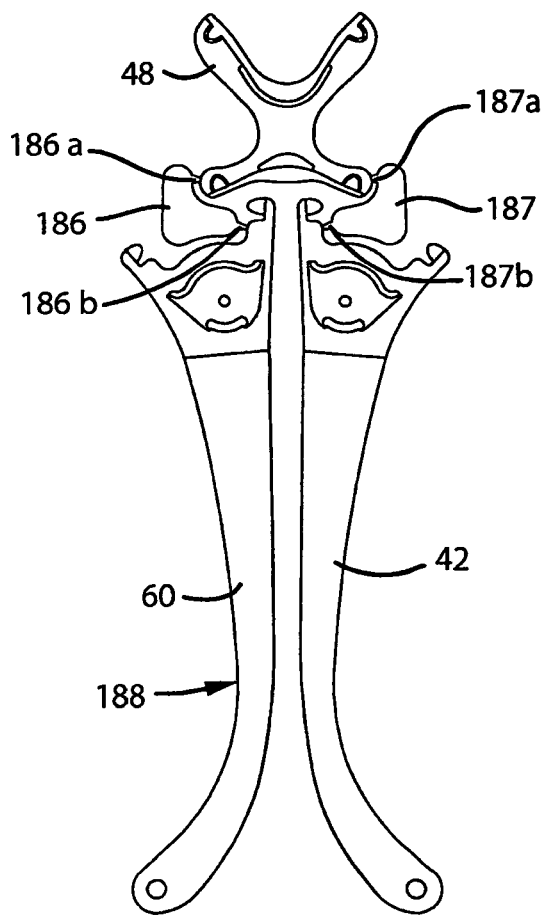
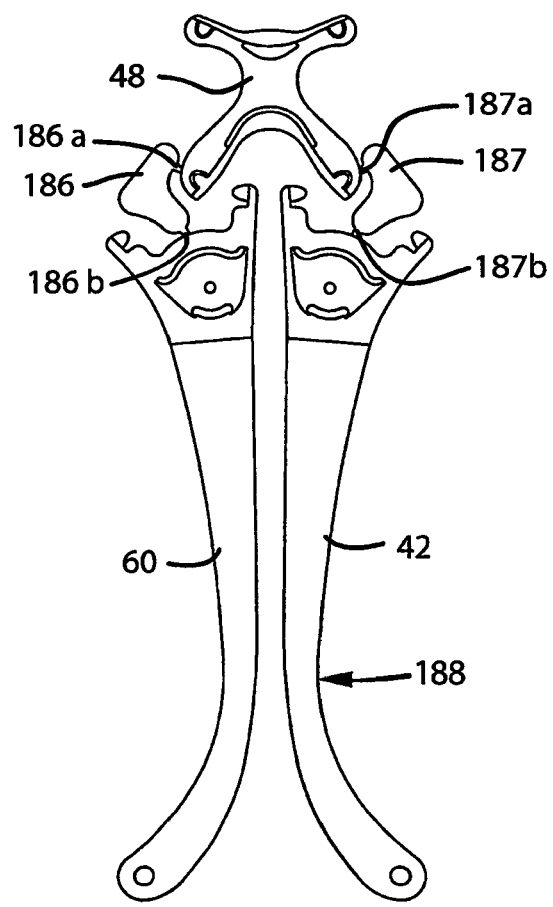

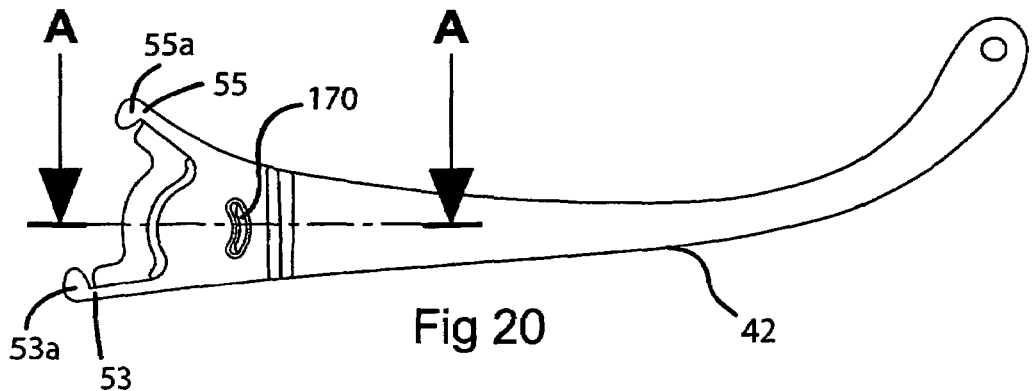
Fig 20
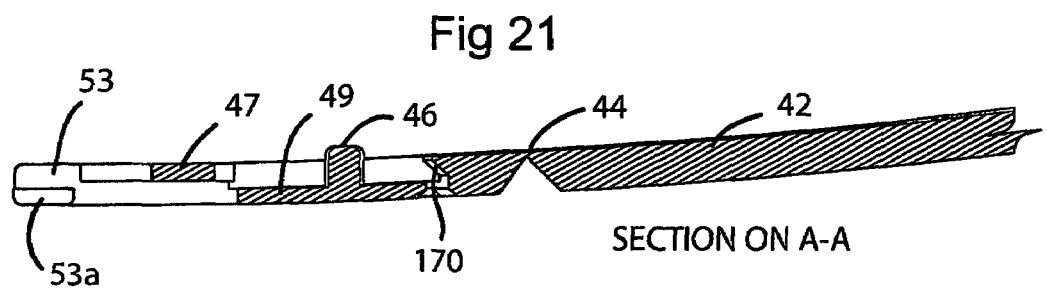
Fig 21
SECTION ON A-A
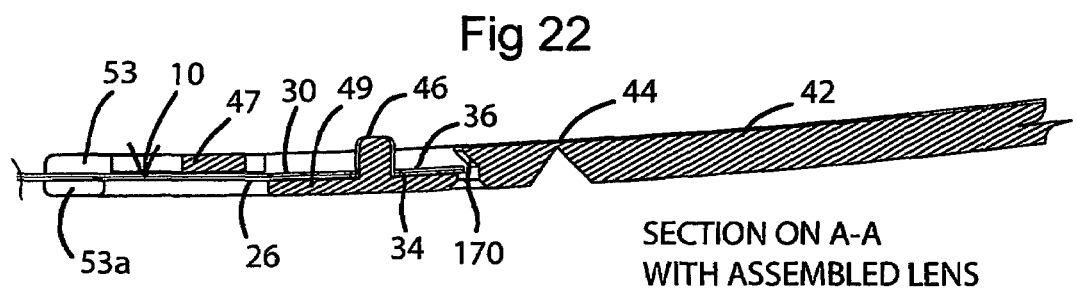
Fig 22
SECTION ON A-A
WITH ASSEMBLED LENS
Fig 23
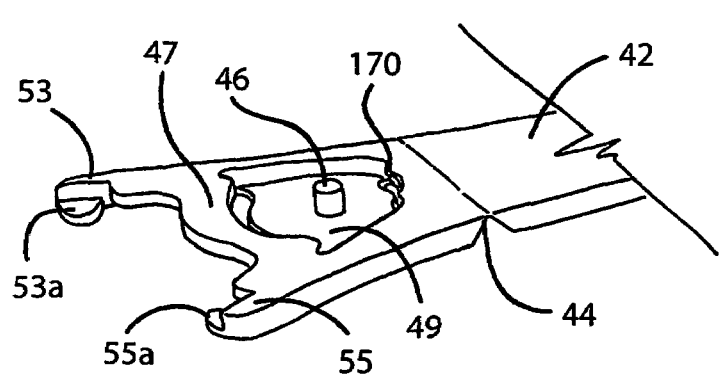

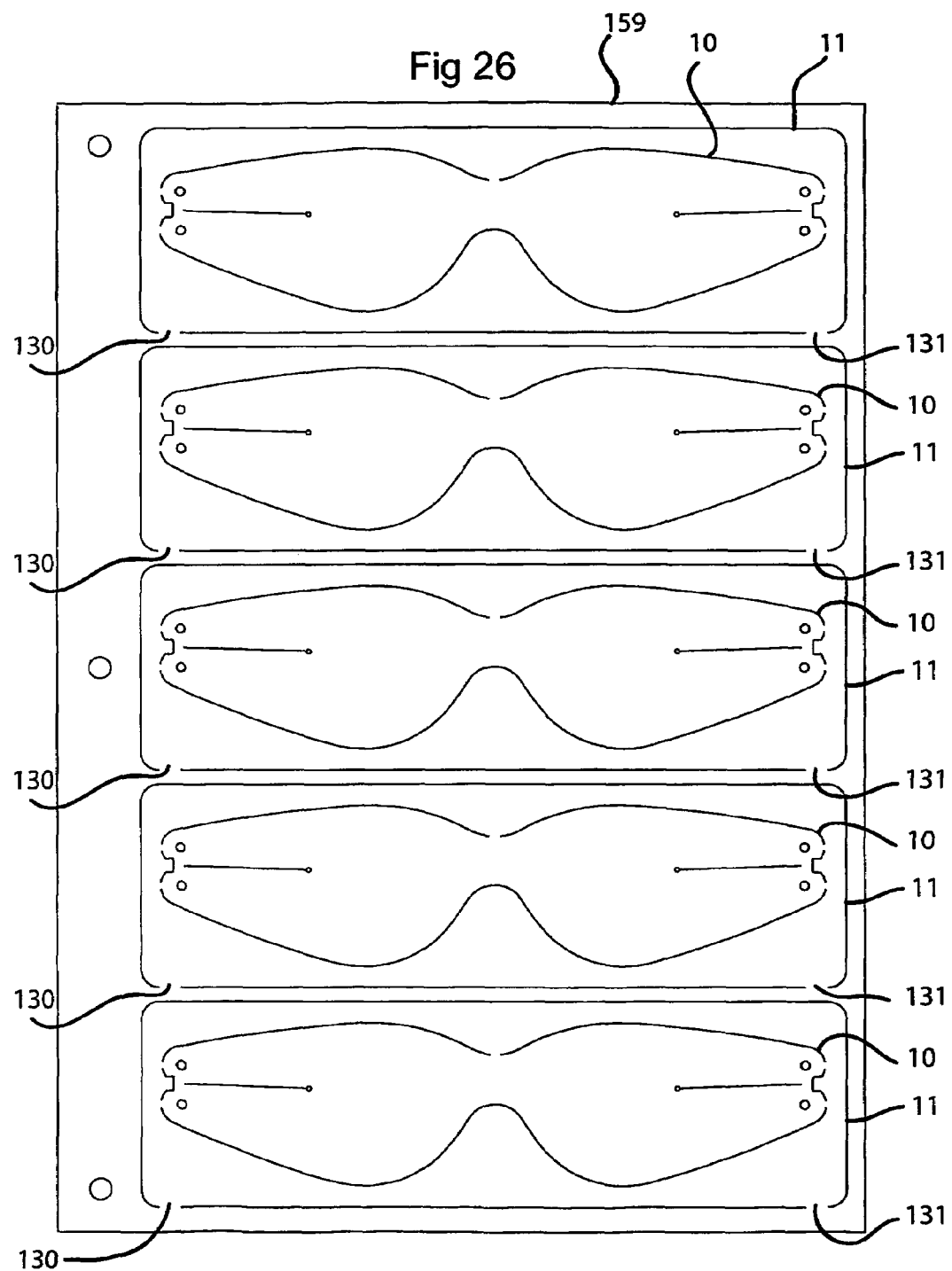

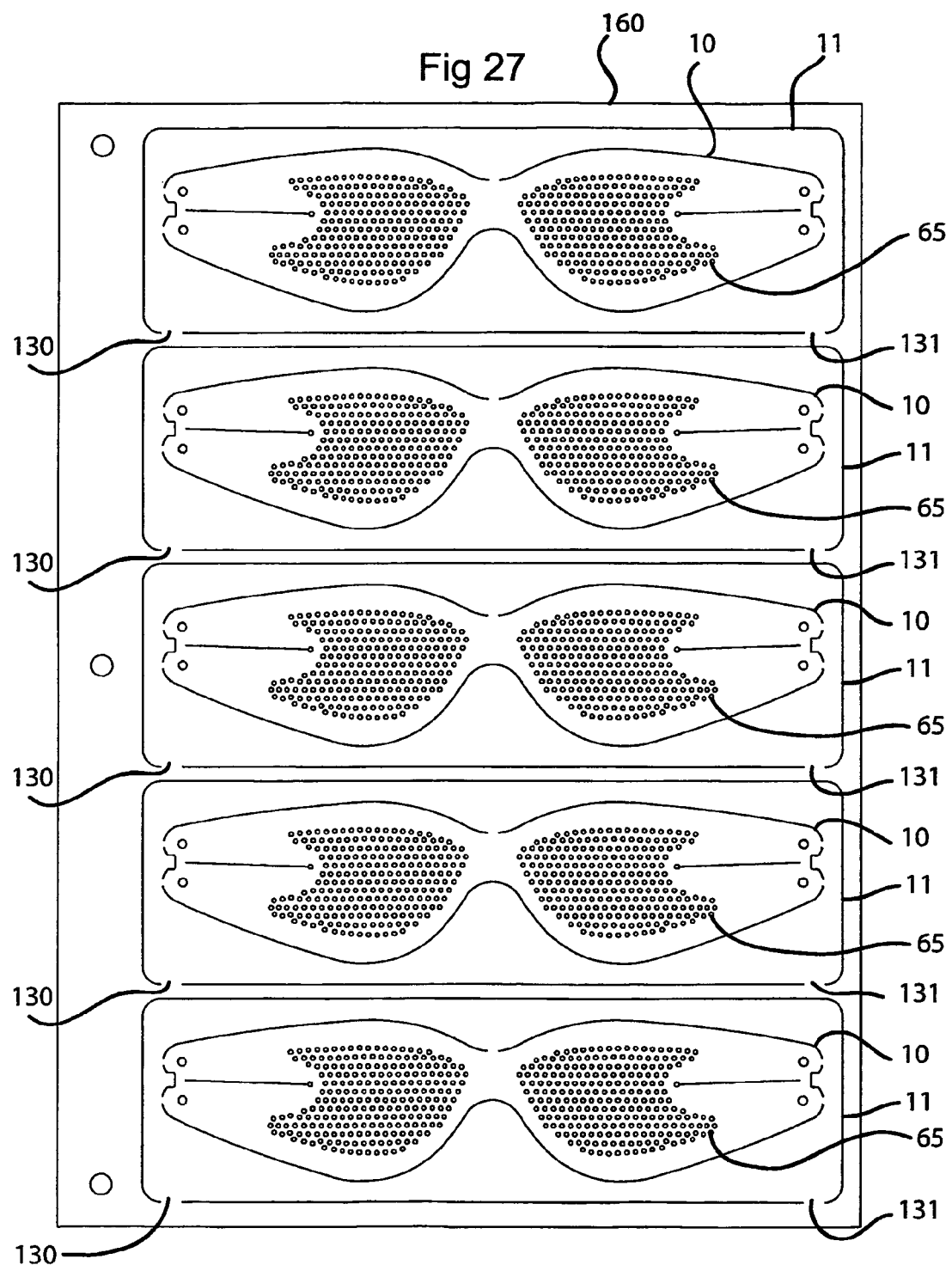

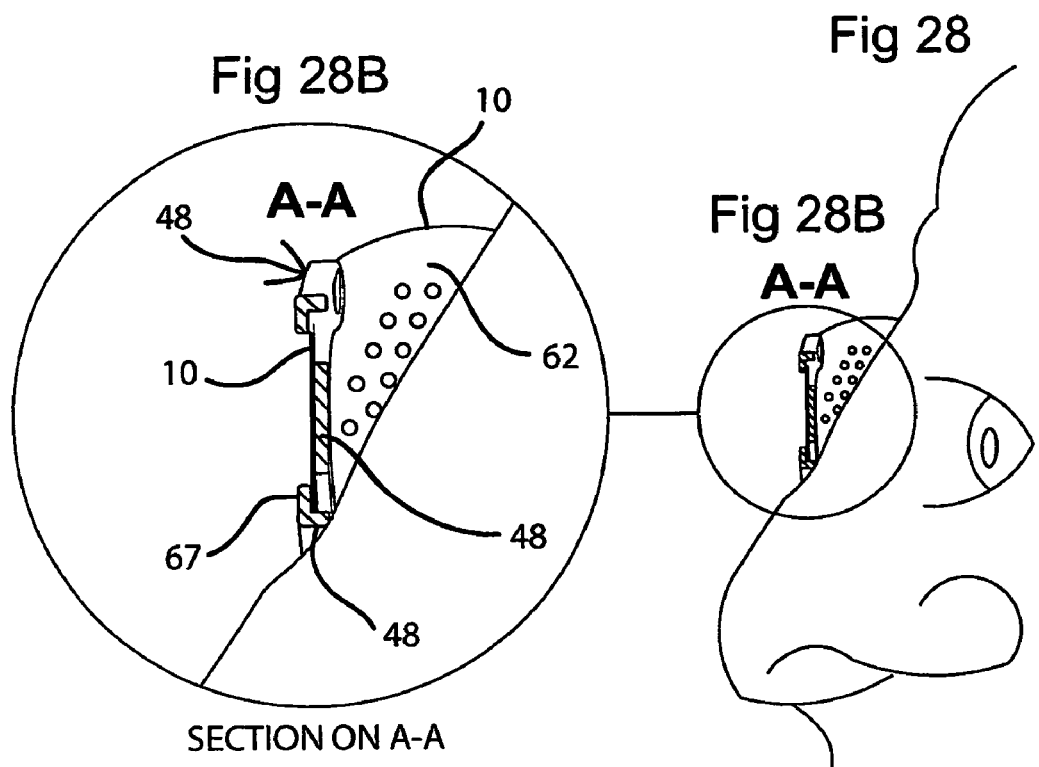
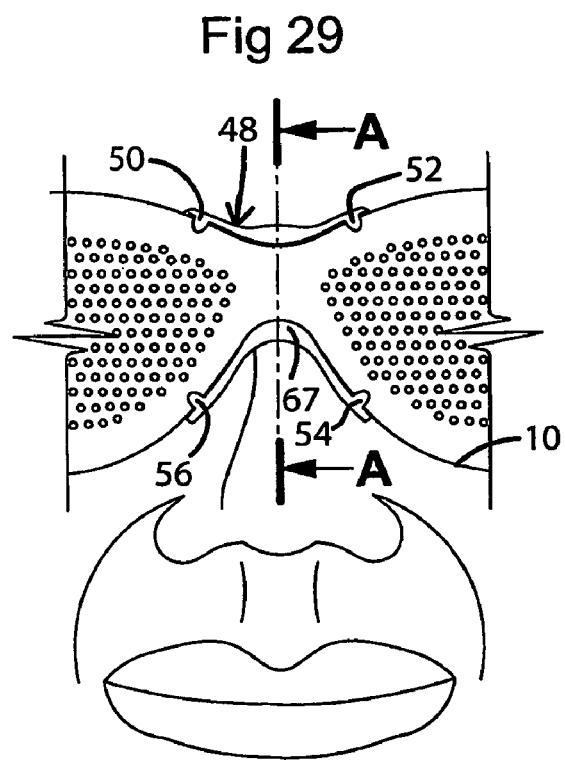

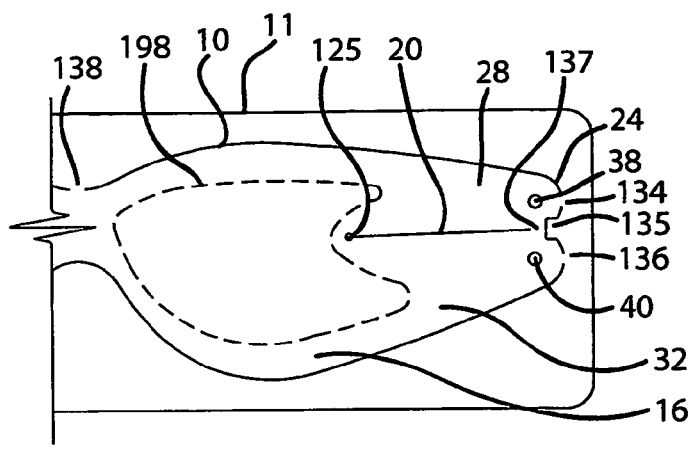
Fig 30
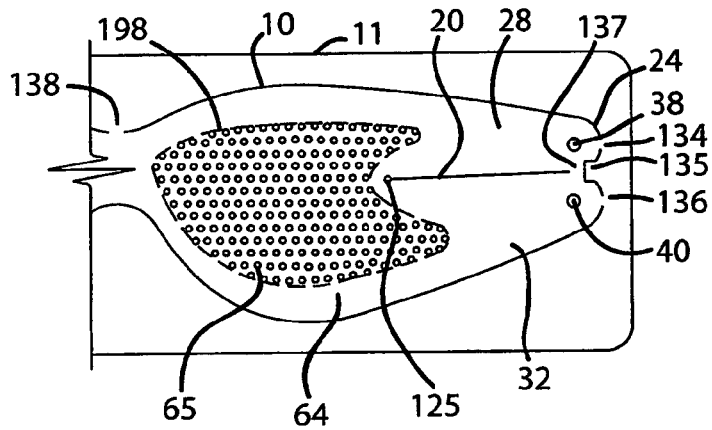
Fig 31
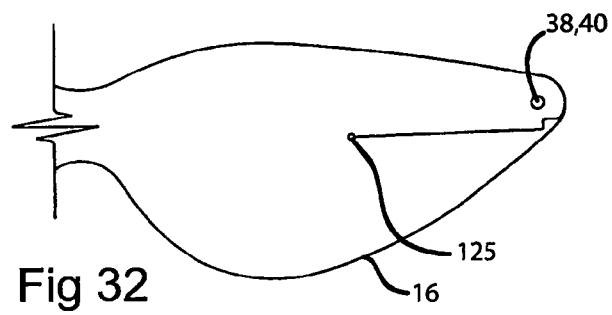
Fig 32
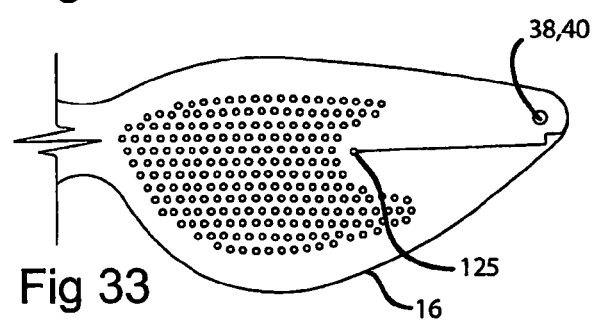
Fig 33
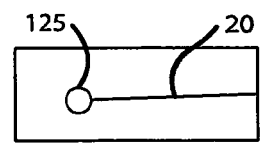
Fig 30a
Fig 30b
Fig 30c
Fig 30d

SPECTACLE KIT This application is a U.S. National Stage filing under 35 U.S.C. §371 and 35 U.S.C. §119, based on and claiming priority to PCT/GB2003/003355 for "SPECTACLE KIT".

FIELD OF THE INVENTION

This invention relates to a kit for a pair of spectacles. More particularly his invention relates to a kit for a pair of self assembly spectacles. More particularly still this invention relates to self assembly sunglasses of the type where advertising matter is displayed thereon.

RELATED ART

It is known for self assembly sunglasses to be provided in airline travel packs and as to promotional matter at, for example sporting events. Such sunglasses are generally provided flat packed and comprise a crude design.

The process of printing promotional matter onto lenses or frames of such spectacles can also be time consuming and expensive.

SUMMARY OF THE INVENTION

According to the present invention there is provided a spectacle kit comprising a pair of lenses made of flexible material joined by a nose bridge portion, and a pair of side arms, each lens having an outer upper portion and an outer lower portion said upper and lower portions being moveable toward one another so as to overlap and form a convex curved portion in each lens.

Advantageously the kit of spectacle parts can be quickly assembled to provide aesthetically pleasing eyewear with curved lenses normally associated with pro assembled conventional spectacles.

The lens material may be flat sheet material which allows printed matter to be provided thereon The lenses may comprise coloured or sunlight filtering lenses.

The lenses may be provided with a plurality of apertures through which a wearer may see. These apertures assist in obscuring sunlight and the lens material need not be transparent hence allowing a wider range of printing techniques to provide printed matter thereon.

The apertures may comprise holes.

The apertures may comprise slots.

The upper portions and the lower portions may be provided with apertures in their end portions such that the holes are aligned during assembly of the spectacles.

The side arms may comprise spigots of a suitable size to receive the aligned holes of each end of the spectacle lens.

The upper portions and lower portions may be connected to each other.

The upper and lower portions may be connected to each other by a perforated strip.

The upper and lower portions may be arranged to overlap one another during assembly.

The spectacle side arms may be manufactured from flexible flat sheet material.

Advantageously the side arms may be manufactured from a similar or identical material to that of the lens and therefore be cut out from the same sheet material during the manufacturing process.

The side arms may be provided with folds to assist in their assembly.

The side arms may include rigid plastic material.

The side arms may include a hinge portion.

Each side arm may include a slot suitable for receiving a corresponding end portion of the pair of flexible lenses.

Each slot may be adjacent the spigot.

The side arms may be curved so as to be suitable for gripping the sides of a wearers head. The hinge portion may comprise a notch so as to enable the side arms to be folded toward one another during use of the spectacles.

The spectacle kit parts may be all manufactured from the same sheet material and be removably attached to a waste portion of such sheet material such that each kit part may be removed therefrom Also according to the present invention there is provided a pair of spectacles comprising a pair of lenses made from flexible material, each lens having an upper arm and a lower arm disposed at its outer edge, said arms at each edge overlapping one another such that each lens is provided with a curved portion.

BRIEF DESCRIPTION OF THE DRAWINGS

Embodiments of the present invention will now be described with reference to the accompanying drawings in which:

FIG. 10 is a perspective view of a pair of spectacles according to a further embodiment of the present invention.

FIG. 10b is a view of an end of a side arm of FIG. 10

FIG. 18 is a plan view of the kit set components of FIG. 16 excluding the pair of lenses.

FIG. 19 is a plan view of the kit set components of FIG. 17 excluding the pair of lenses.

FIG. 20 is a perspective view of an arm of FIGS. 18 and 19.

FIG. 21 is a part scrap section through the arm of FIG. 20.

FIG. 22 is a part scrap section through the arm of FIG. 20 with additional parts of the kitset shown.

FIG. 23 is a partial view of a side arm of FIGS. 8 and 9.

FIG. 26 is a top view of a series of lenses disposed within sheet material.

FIG. 27 is a top view of a series of lenses disposed within sheet material according to a further embodiment of the present invention.

FIG. 28 is a part scrap section through an assembled bridge of the present invention.

FIG. 28b is a magnified view of FIG. 28.

FIG. 29 is a front view of FIG. 28.

FIG. 30 is a front view of a lens disposed within sheet material according to one embodiment of the present invention.

FIGS. 30a, 30b, 30c and 30d show alternative tear stop holes of FIG. 30.

FIG. 31 is a front view of a lens disposed within the sheet material according to one embodiment of the present invention.

FIG. 32 is front view of the lens of FIG. 30 manipulated into its useable form.

FIG. 33 is a front view of the lens of FIG. 41 manipulated into its useable form.

DESCRIPTION OF THE PREFERRED EMBODIMENTS

Figure 1:
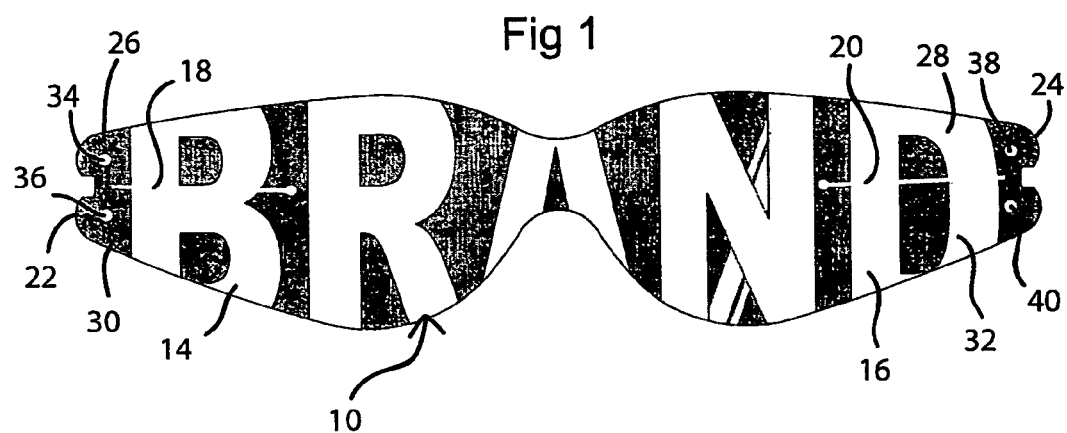
FIG. 1 is a front view of a pair of lenses according to one embodiment of the present invention.
Figure 2:
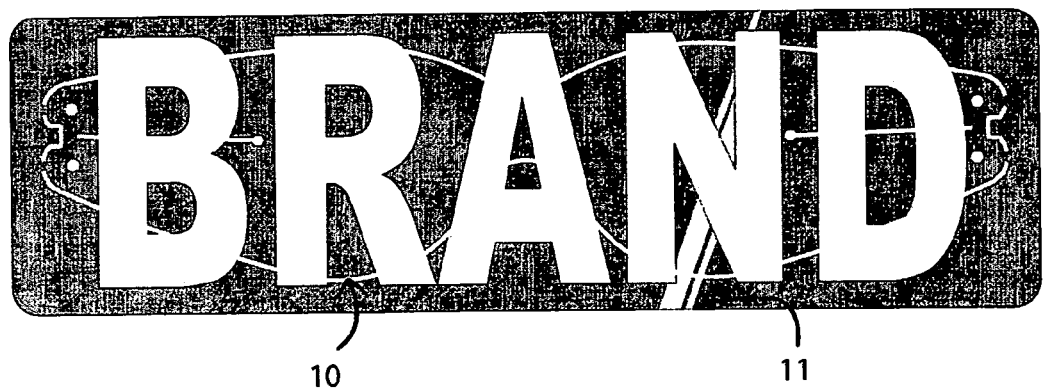
FIG. 2 is a front view of a pair of lenses according to one embodiment of the present invention disposed within sheet material packaging.
Figure 5:
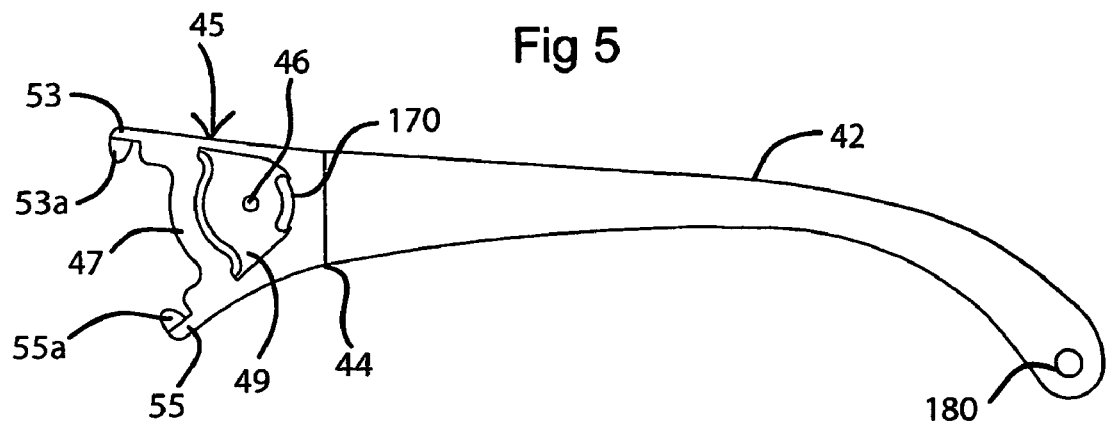
FIG. 5 is a perspective view of an arm of the spectacles of FIGS. 4 and 5.
Figure 6:
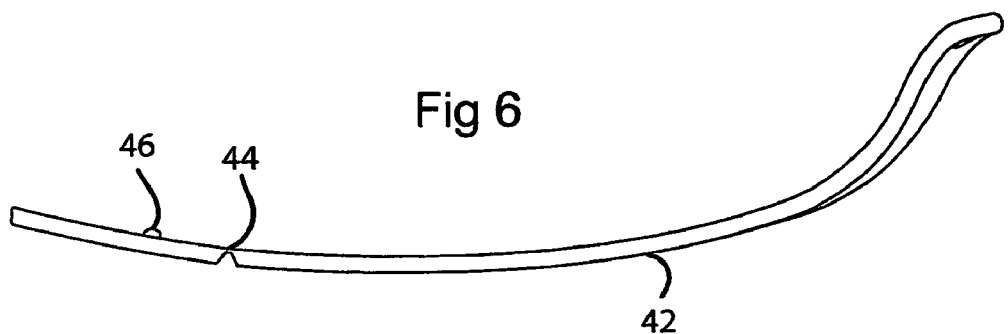
FIG. 6 is a top view of the arm shown in FIG. 7.
Figure 7:
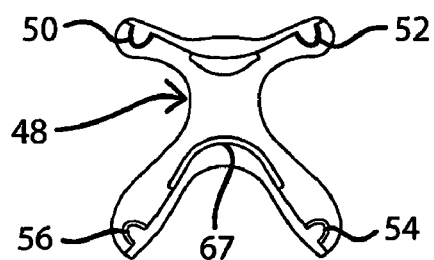
FIG. 7 is a perspective view of the nosepiece of the spectacle of FIGS. 4 and 5.

A spectacle kit set according to an embodiment of the present invention contains a pair of lenses 10 shown in FIGS. 1 and 2, a pair of arms shown in FIGS. 5 and 6 and a nosepiece 48 shown in FIG. 7. The tenses 10 are manufactured from a flexible flat sheet material such as polyester, polycarbonate, acetate or acrylic. It is envisaged that the spectacle kit would be given to a wearer of the spectacles in kit set form, for self assembly. Thus promotional or design printed matter could also be provided over the waster portion 11 of the packaging as shown in FIG. 2.

This flat sheet material is printed with a design indicated by the word brand. The flexible lenses of FIG. 1 are originally mounted in kit set form within a flat sheet material of the same composition. The shape of the lenses is cut out in this material and is easily removable therefrom. The flexible material is darkened so as to provide protection from ultraviolet light.

Figure 3:
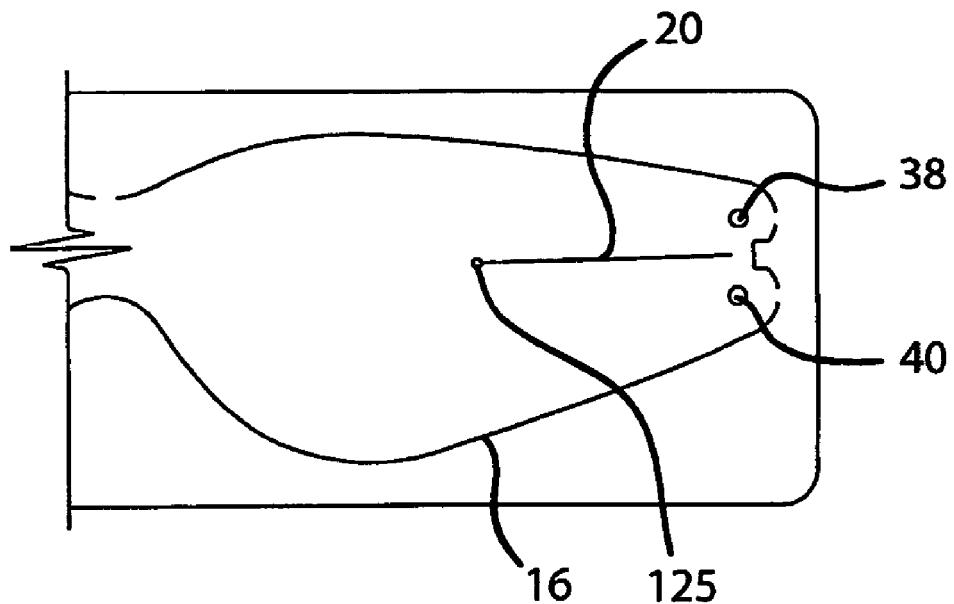
FIG. 3 is a magnified view of one lens of FIG. 1.
Figure 4:
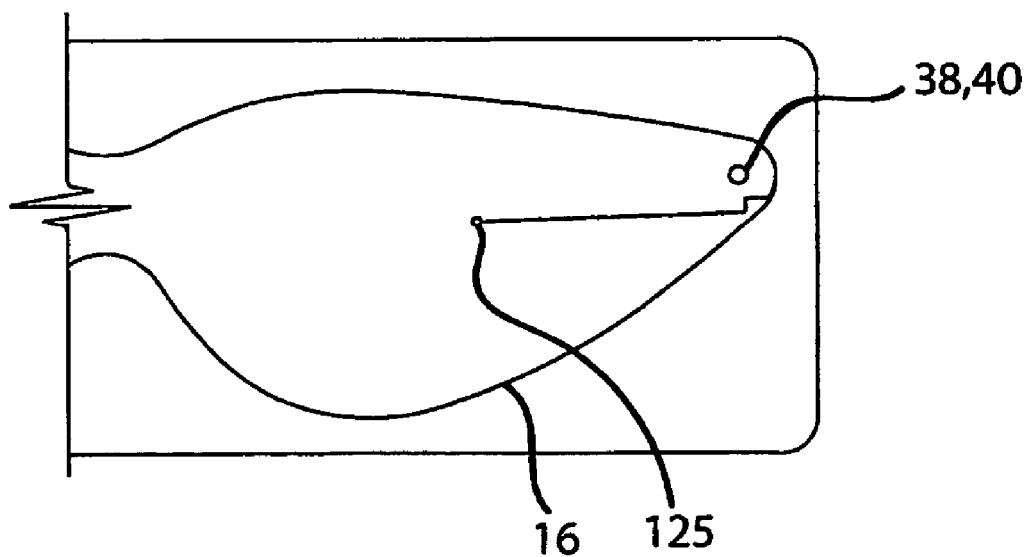
FIG. 4 is a magnified view of a lens according to a further embodiment of the invention.

Referring in particular to FIGS. 3 and 4 each lens 14, 16 is provided with a slot 18, 20 which extends from each outer edge 22, 24. The slots 18 and 20 extend from the outer edge of each lens to approximately halfway across each lens 14, 16. Each slot 18, 20 divides each lens 14, 16 into an upper arm and a lower arm 30, 32. Holes 34, 36, 38 and 40 are provided in the outer edge of each arm 26, 28, 30 and 32. The slot 20 is only partially formed so as to provide a thin seam which can easily be broken thus parting the upper and lower arms. A tear stop aperture 125 is provided to prevent damage to the lens during this 'parting' operation.

Figure 1B:
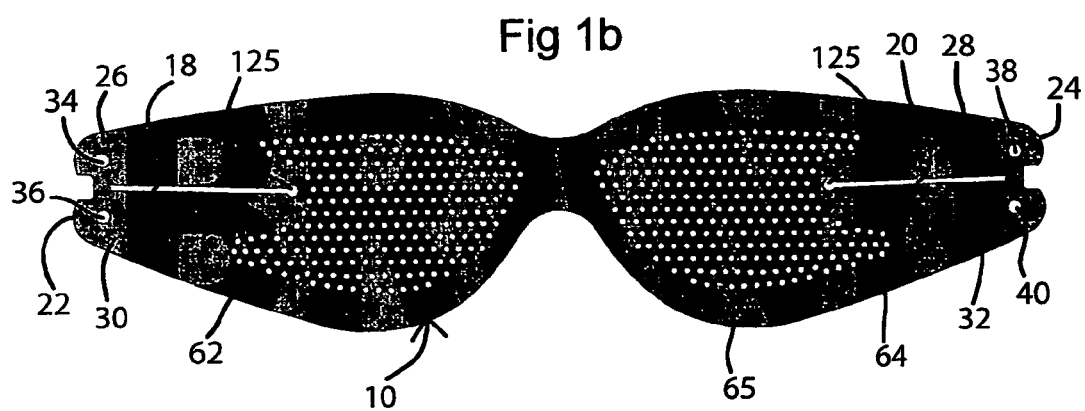
FIG. 1b is a front view of a pair of lenses according to a further embodiment of the present invention.
Figure 2B:
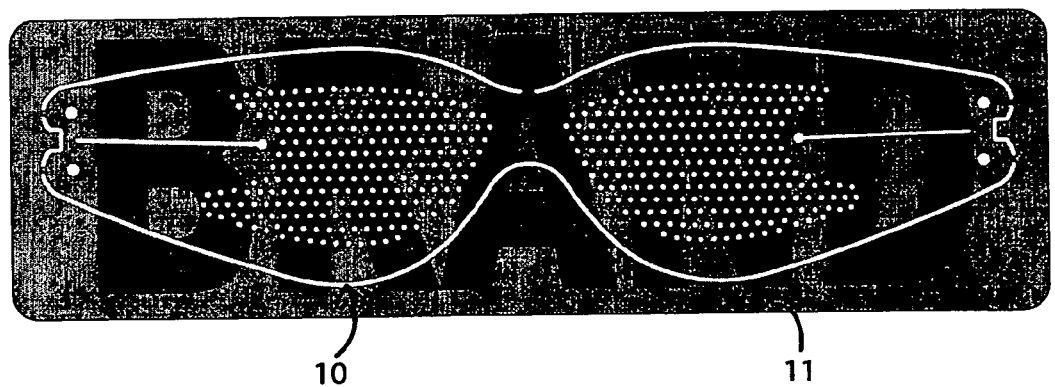
FIG. 2b is a front view of a pair of lenses according to a further embodiment of the present invention, disposed within sheet material packaging.
Figure 1C:
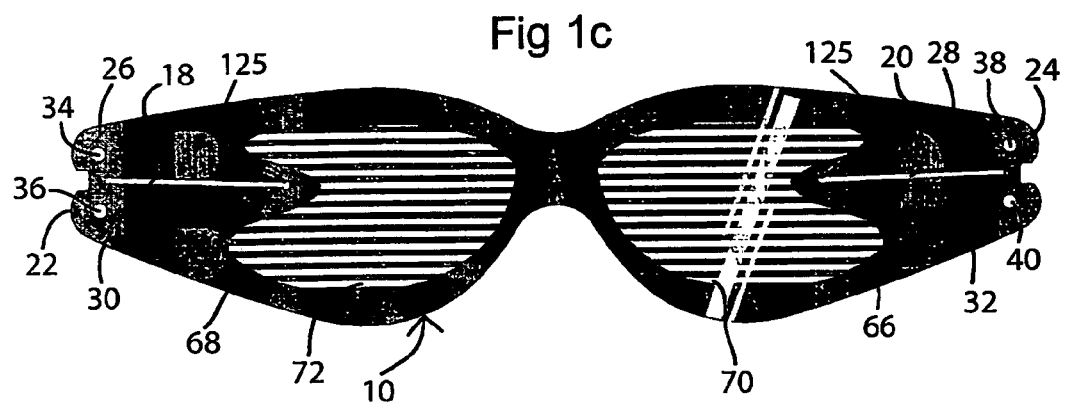
FIG. 1c is a front view of a pair of lenses according to a further embodiment of the present invention.
Figure 2C:
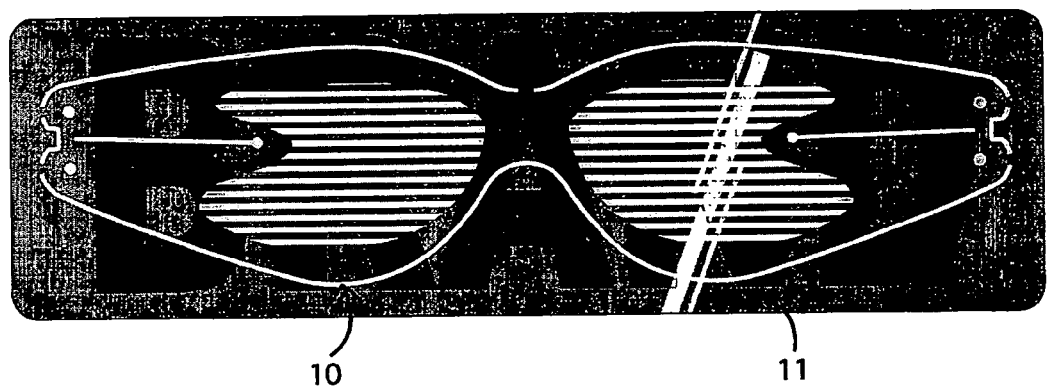
FIG. 2c is a front view of a pair of lenses according to a further embodiment of the present invention, disposed within sheet material packaging.

In FIGS. 1b and 2b the flexible lens material is provided with a series of apertures 65 which allow enough light to be transmitted through whilst still providing protection from the sun's rays.

During assembly of the spectacles, which will be described in more detail later, arm 28 of overlaps the arm 32 and the holes 38 and 40 are aligned with one another. The lens 14 is manipulated during assembly of the spectacles in the same manner.

One spectacle side arm 42 is shown in FIG. 5 and FIG. 6. In this embodiment of the invention the spectacle arm is manufactured from moulded plastic although any suitable material could be used. The arm 42 is of a curved elongate shape suitable for gripping the side of a wearers head or resting on their ears. A hinge 44 is formed adjacent one end of the arm 42 by providing a notch within the plastic material. This hinge 44 assists a wearer of the spectacles by allowing the spectacles to sit comfortably and lightly grip the sides of his head. A spigot 46 is provided on the inner end portion of the arm 42 and is of a size to comfortably receive a lens 16 through holes 38 and 40. One end 45 adjacent the hinge 44, of the arm 42 is provided with a bridge element 47 and an opening 49 designed to receive the overlapping arms 28, 32 of the lens 16. The outermost extremity of this end 45 of the side arm 42 is provided with a pair of legs 53, 55, each leg having a clip 53a, 55a suitable for positioning over the lens once attached to the arm. A retaining member 170 ensures that the ends of the overlapping arms are tucked underneath in situ over the spigot 46.

The nosepiece 48 of the spectacle kit is shown in FIG. 7 again the nosepiece in this embodiment is made from moulded plastic but any suitable material could be used. U shaped clips 50, 52, 54 and 56 and 67 are provided on the outer portion of the nosepiece 48 and are arranged to be more suitable for attachment to the bridge portion of the lenses 10. This can be seen more clearly by reference to FIG. 8. The clearance between the clips 50, 52, 54 and 56 is therefore of a suitable size to receive the plastic sheet material of the bridge portion of the lens 10 whilst also being able to grip the bridge. The ends of the side arms 42, 60 are provided with apertures 180 and 181 for receiving a cord band 183 as shown in FIG. 10. This cord band 183 has a knot 184 formed in either end so that the wearer can drape the spectacles around their neck.

Figure 8:
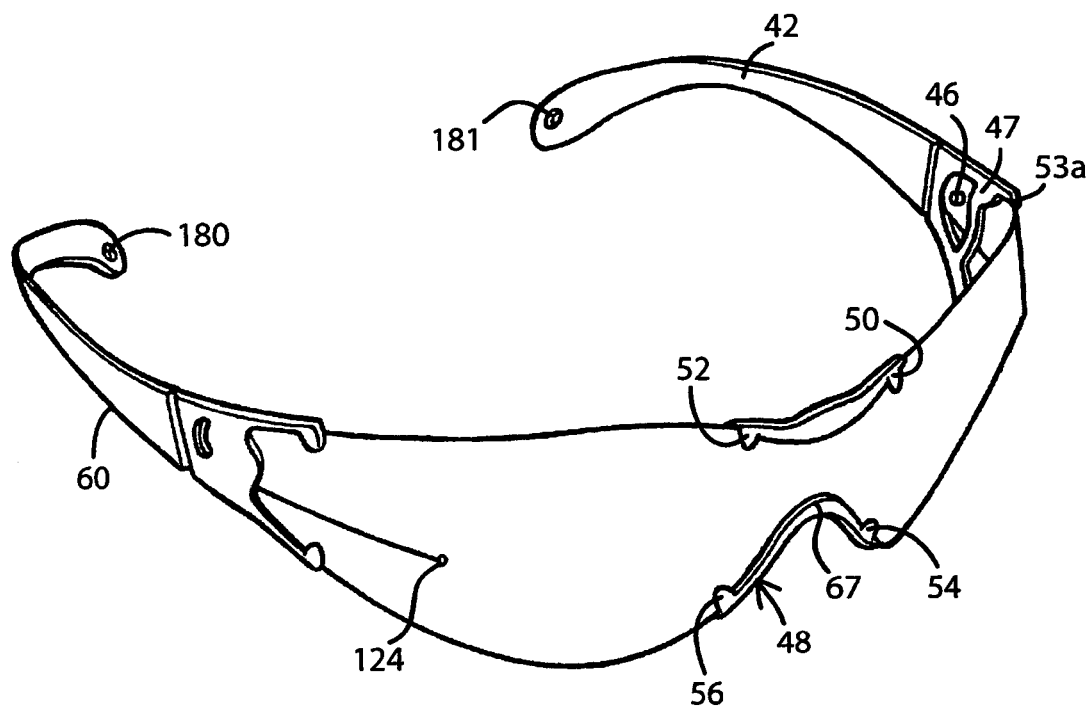
FIG. 8 is a front perspective view of a pair of spectacles of the present invention.
Figure 9:
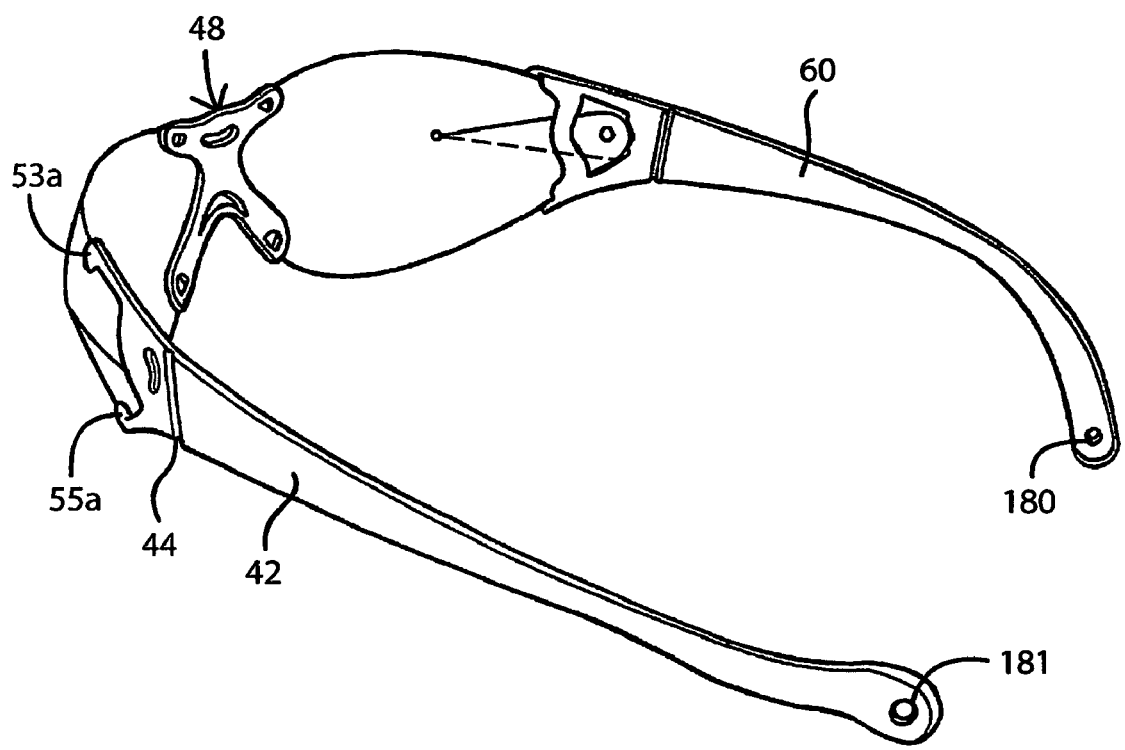
FIG. 9 is a rear perspective view of the spectacles shown in FIG. 8.

A pair of spectacles 58 formed from assembly of the kit parts sown in FIGS. 1 to 4 is shown in FIGS. 8 and 9. A side arm 42 is shown attached to the lenses 10 and a further side arm 60 is shown similarly attached to the lenses 10 at the opposite side of the spectacles 58. The side arm 60 is of an identical configuration to the side arm 42. Each lens upper arm 24, 26 is shown overlapping its corresponding lower arm 30 and 32 and affixed to its associated side arm 42, 60.

In order to assemble to spectacles 68 the lenses 10 are formed into their convex configuration by overlapping the arms 28, 32 and 26, 30. Although only overlapping has been referred to it is envisaged that the convex shape could also be achieved by folding the sheet material of the lenses. The apertures 38, 40 and 34, 36 are aligned and each end of each lens is inserted within the opening 49 of their associated side arms and located underneath the bridge 47 of each side arm 42, 60 the aligned holes 38, 40 and 34, 36 are then located over the spigots 46 of each side arm and the arms of the lenses are held in place via clips 53a and 55l.

The nose piece 48 is clipped over the bridge portion of the lenses and held in place clips 50, 52, 54 and 56 and 67.

The kit set is advantageously assembled quickly and easily by the wearer and readily formed into a convex ergonomically shaped pair of spectacles with a curved portion formed in each lens.

A further embodiment of the invention is shown in FIG. 10. The lenses 62 and 64 are made from flexible flat sheet material comprising a plural of aperture 65 forming an obscuration type of lens. This advantageously allows the lenses to be made using a variety of flexible sheet material which is suited to different printing processes.

Figure 11:
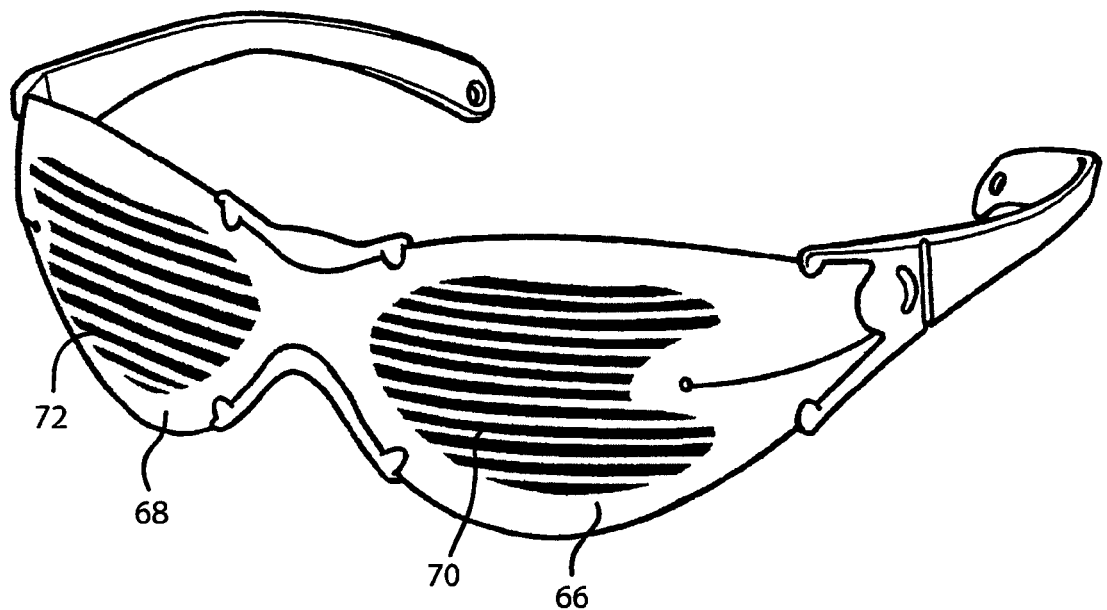
FIG. 11 is a perspective view of a pair of spectacles according to another embodiment of the present invention.

A further example of the type of flexible lens material suitable for the present invention is shown in FIG. 11, In this case each lens 66, 68 is provided with an area of slitted material 70 and 72 which again forms an obscuration type of lens which allows different printing techniques to be used to transfer or print patterns or promotional design onto the lens directly.

Figure 12:
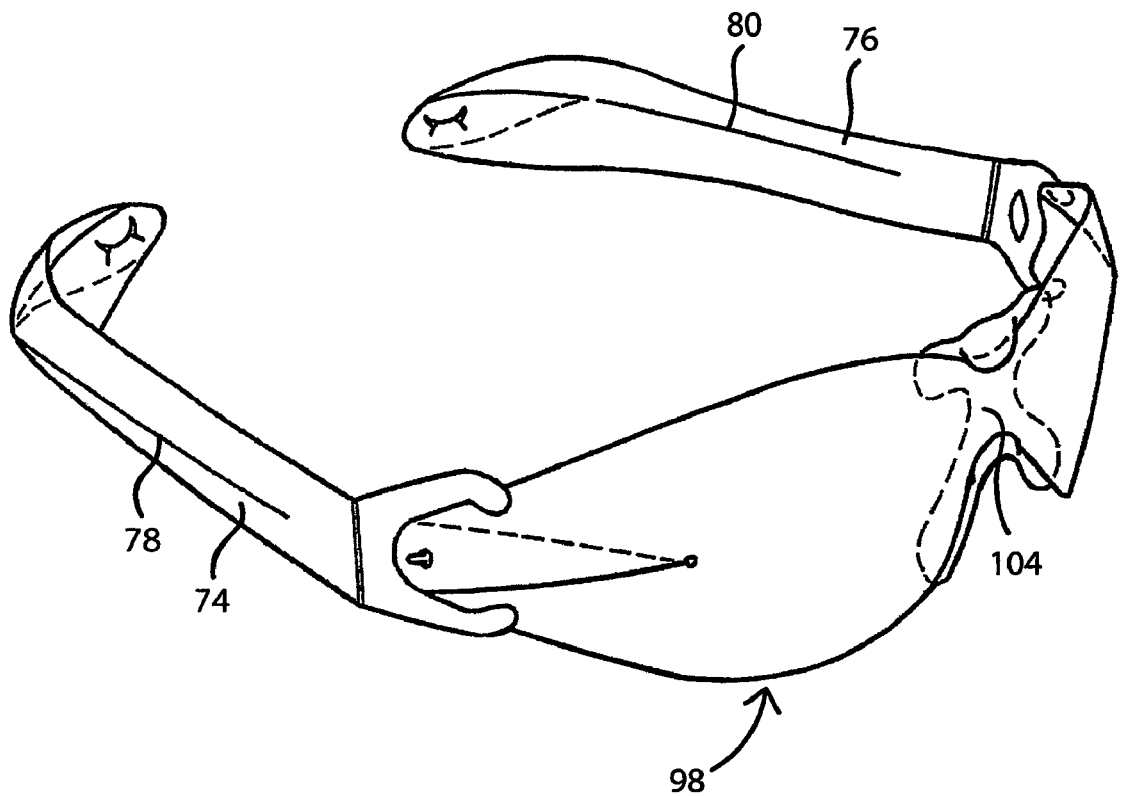
FIG. 12 is a perspective view of a pair of spectacles according to a further embodiment of the present invention.
Figure 13:
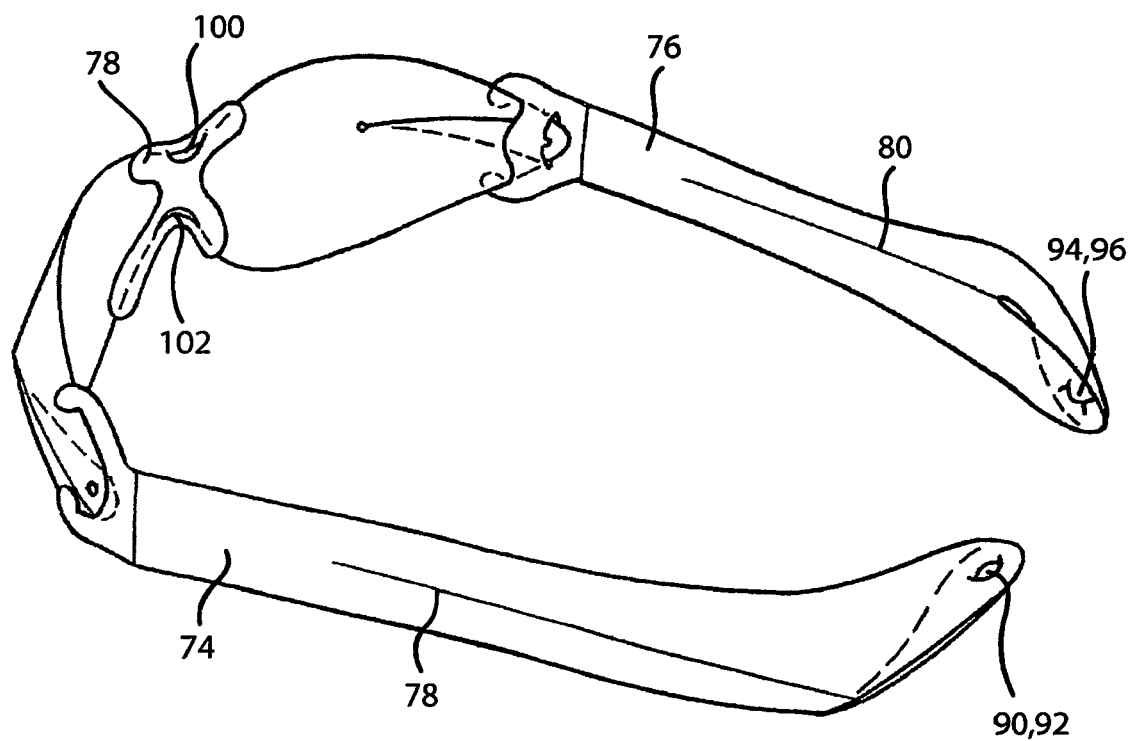
FIG. 13 is a rear perspective view of the spectacles shown in FIG. 12.
Figure 14:
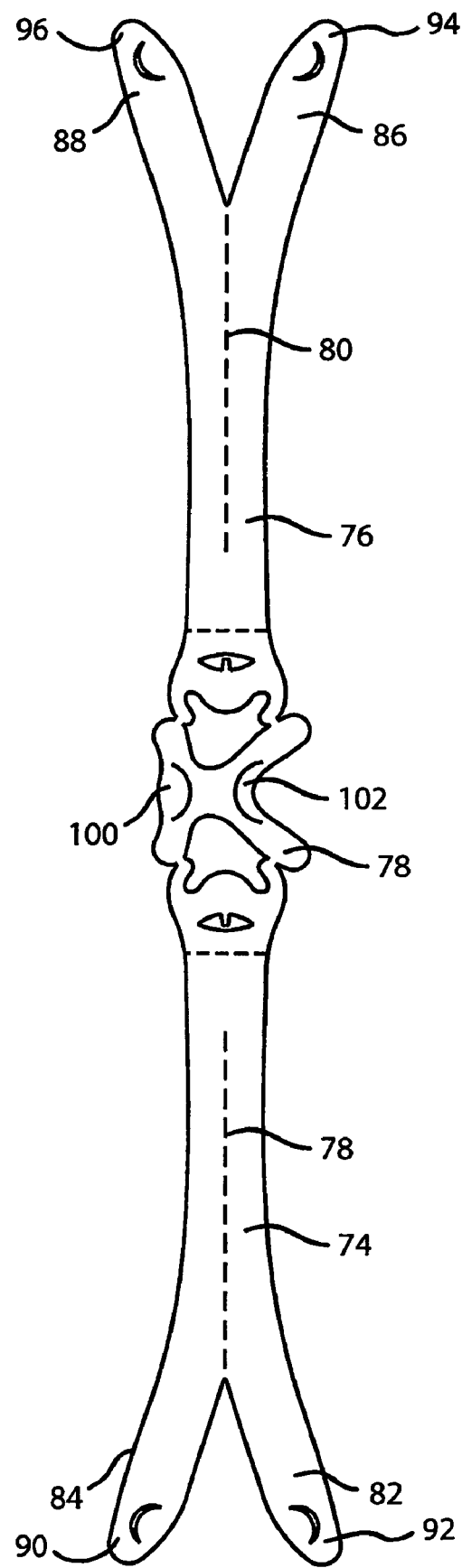
FIG. 14 is a top view of the arms and nose piece of the spectacles of FIGS. 12 and 13 shown in their kit set layout.

A further embodiment of the invention is shown in FIGS. 12, 13 and 14 in which the side arms 74 and 76 and the nose bridge 78 are manufactured from material less rigid than the plastic side arms 42 and 60. The side arms 74 and 76 and the nose bridge 78 are originally provided as flat flexible material in a flat pack arrangement shown in FIG. 14. Each side arm 74 and 76 contains a fold line 78 and 80 along which the assembler folds the arms. Each arm at its leg portion is also provided with a moon shaped slit forming a flap 90 and 92 and 94 and 96. During assembly of the spectacles 98, the side arms 74 and 76 are folded and the flaps folded inside one another such that the arms 74, 76 are formed into a curved shape designed to grip the sides of the wearers head.

The piece 78 is also provided with a pair of moon shaped slits forming flaps 100 and 102. These flaps are clipped over the bridge portion 104 of the spectacles 98 and hold the nose piece in place.

Figure 15:
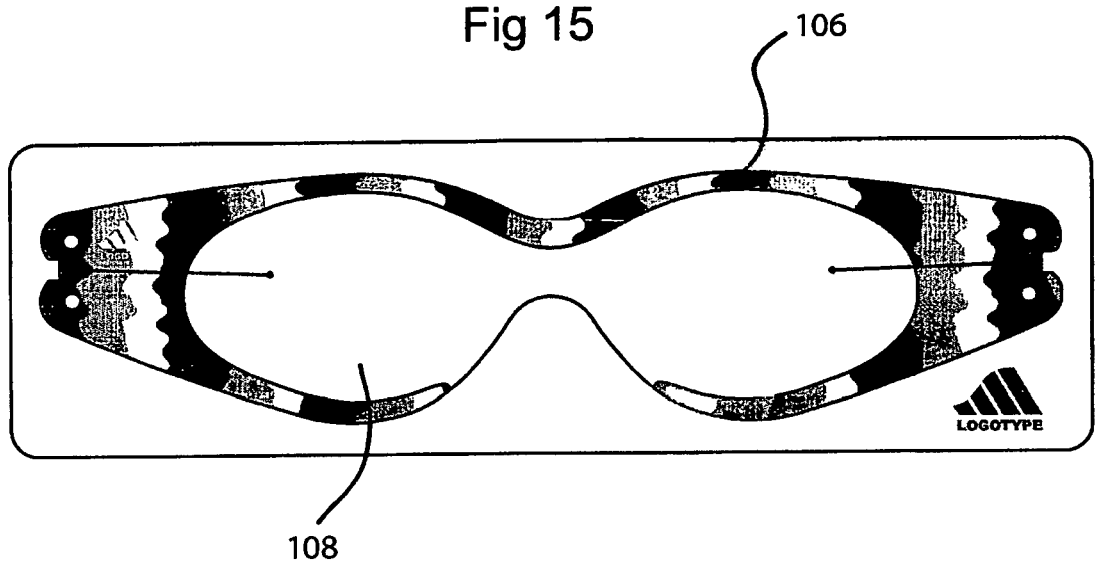
FIG. 15 is a front view of a pair of lenses according to a further embodiment of the present invention.

FIG. 15 shows another embodiment of the invention where a design 106 is applied only to the edges of the lenses 108 giving the appearance of frames around the lenses.

Figure 16:
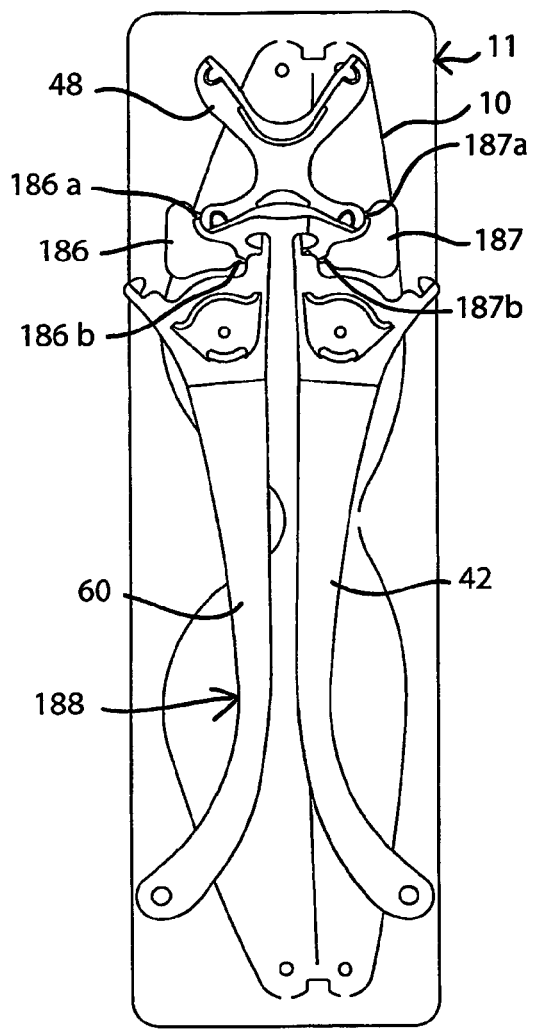
FIG. 16 is a plan view of the kit set components of the present invention.
Figure 17:
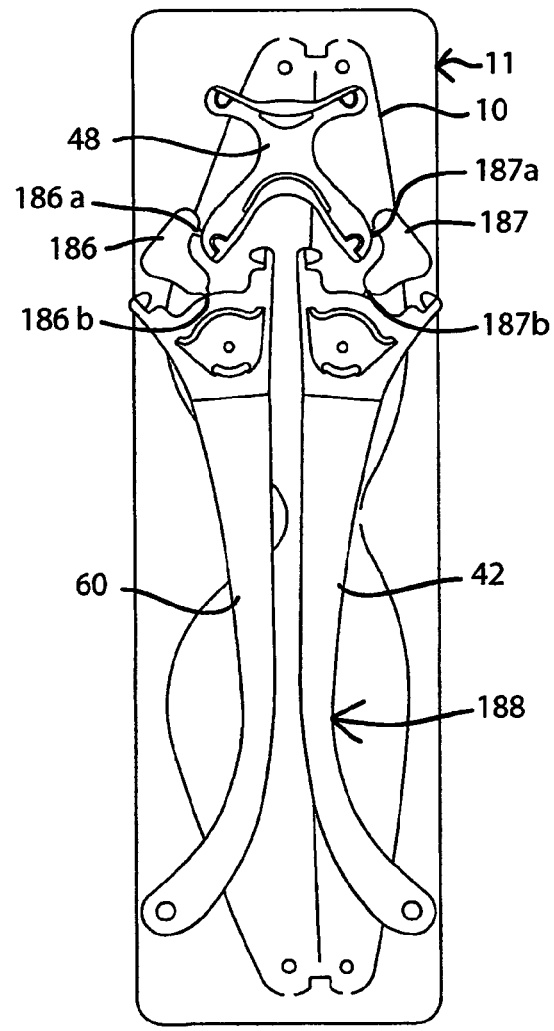
FIG. 17 is a plan view of an alternative arrangement of the kit set components of the present invention.

FIGS. 16 and 17 show the components of the kit set in their manufactured configuration and as a user may initially receive them. The side arms, lens and nosepiece fit together in an overlapping arrangement. The kitset is advantageously a total of two separately manufactured components detachable into four parts 48, 42, 60 and 10 ready for assembly. The waste parts are portions 11, 186 and 187 and can be discarded once the useful portions have been removed from this packaging.

Now referring to FIGS. 18 and 19, a kit set 188 of parts 48, 42 and 60 are connected to waster portions 186 and 187 by means of small bridges of plastic 186a, 186b, 187a and 187b such that the nose bridge 48 and ear temples 42 and 60 may be torn from the waster portions 186 and 187. The kit set is then assembled by the user forming a promotional set of spectacles.

A number of configurations are possible as illustrated in FIGS. 18 and 19, however it is preferred that the kit set of side arms 60 and 42 and nose bridge 48 are formed in a single moulding. The kit set of parts shown in FIGS. 16 and 17 fit within the rectangular plan view of the lens 11. This enables all the parts including the lens to be easily stored and flat packed.

Figure 24:
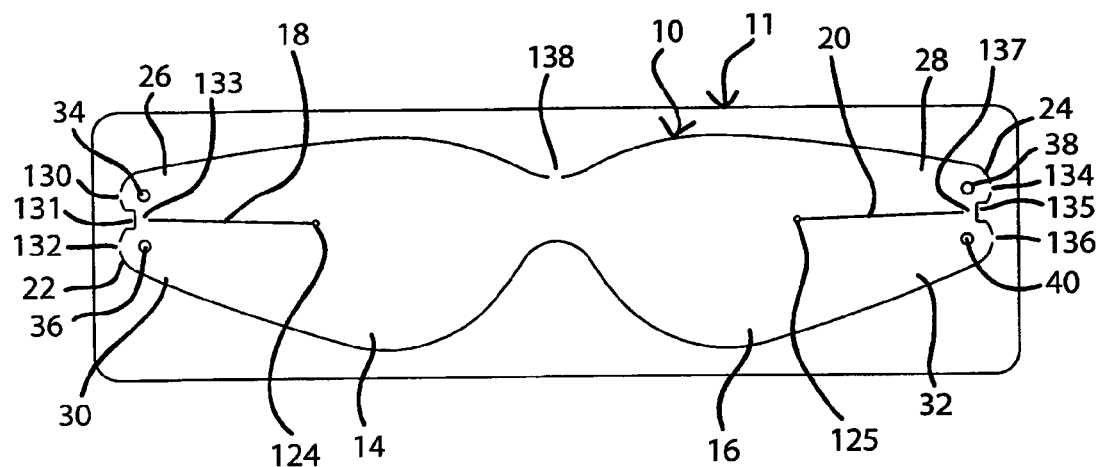
FIG. 24 is a top view of a pair of lenses disposed within sheet material packaging according to on embodiment of the present invention.
Figure 25:
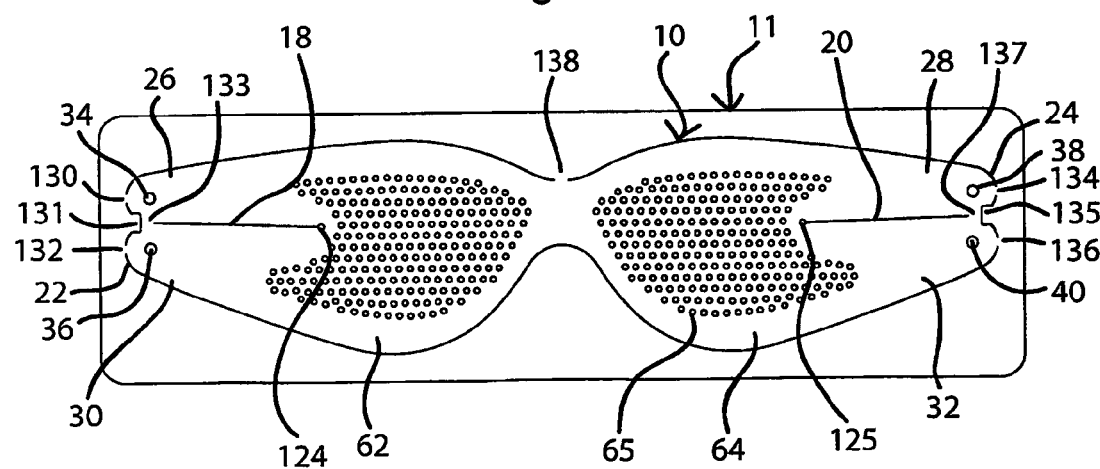
FIG. 25 is a top view of a pair of lenses disposed within sheet material packaging according to a further embodiment of the present invention.

Now referring to FIGS. 24 and 25, a pair of lenses 10 are formed from a sheet of flexible material and is easily removed therefrom by utilising a series of perforations 138, 134, 136, 130 and 132. In this embodiment of the invention the slots 18 and 20 are fully formed but do not extend to the outer edges of their corresponding lens thus the upper and lower arms 26, 30 and 28, 32 are separated from each other by breaking this joint 133. Notches 131 and 135 allow the lens to be easily removed from the waste material 11.

Now referring to FIG. 26 a series of lens are shown disposed within the sheet material 159 during manufacturing. FIG. 27 similarly shows a series of perforated lenses disposed within the sheet material 160 during manufacturing. Advantageously, the perforations 130 and 131 retain a series of sheet material packaging lenses in either a sheet or roll form during manufacturing. The pitch between centres is kept to a minimum to yield the maximum number of lenses 10 in their respective packaging. This provides economies for both manufacturing the lenses and also in the application of the printed matter.

FIGS. 28, 28b and 29 show the lenses as used by a wearer. The bridge 48 protects the nose from being damaged from sharp edges left during the manufacture of the lenses. This is particularly useful as the lens may be of a width of only 0.075 mm to 0.35 mm. FIGS. 32 and 33 show the upper and lower arms (28, 32) of the lenses of FIGS. 30 and 31 overlapping one another and ready to be attached to the corresponding side arms.

In FIGS. 30 and 31 the lens 10 upper and lower arms are held in the packaging 11 by two perforated regions 134 and 136. The bridge portion of the lens is retained by the perforation 138 in the packaging 11.

The lens 198 is shown by the dotted line defines the area for the field of vision for the lens 16 and 64. The tear stop hole 125 prevents the sift 20 from running into the wearers area field of vision.

Advantageously the present invention provides a ready to assemble pair of spectacles which are comfortable to wear and straightforward to assemble. The shape of the lens or visor portion is shaped to suit the wearer of the assembled spectacles and also to minimise waste sheet material during manufacture. The lens portion of the spectacles is flexible between the nose bridge and the eyes such that the lens can conform to a wearer's individual face shape.

The invention claimed is:

1. A spectacle kit comprising:
   a pair of lenses made of flexible material joined by a nose bridge portion, and
   a pair of side arms,
   each lens having an outer upper portion and an outer lower portion said upper and lower portions being moveable toward one another so as to overlap and form a convex curved portion in each lens, and
   each side arm including a slot suitable for receiving and retaining the upper and lower portions of each lens.

2. A spectacle kit according to claim 1, wherein the lens material comprises a flat sheet material which allows printed matter to be provided thereon.

3. A spectacle kit according to claim 1 wherein the lenses comprise coloured or sunlight filtering lenses.

4. A spectacle kit according to claim 1 wherein the lenses are provided with a plurality of apertures through which a wearer may see.

5. A spectacle kit according to claim 4 wherein the apertures comprise holes.

6. A spectacle kit according to claim 4 wherein the apertures comprise slots.

7. A spectacle kit according to claim 1 wherein the upper portions and the lower portions may be provided with apertures in their end portions such that the apertures are aligned during assembly of the spectacles.

8. A spectacle kit according to claim 7 wherein the side arms comprise spigots of a suitable size to receive the aligned apertures of each end of the spectacle lens.

9. A spectacle kit according to claim 8 wherein each slot is adjacent the spigot.

10. A spectacle kit according to claim 1 wherein the upper portions and lower portions are connected to each other.

11. A spectacle kit according to claim 1 wherein the upper and lower portions are connected to each other by a perforated strip.

12. A spectacle kit according to claim 1 wherein the upper and lower portions are arranged to overlap one another during assembly.

13. A spectacle kit according to claim 1 wherein the spectacle side arms are manufactured from flexible flat sheet material.

14. A spectacle kit according to claim 1 wherein the side arms are manufactured from a similar or identical material to that of the lens and therefore be cut out from the same sheet material during the manufacturing process.

15. A spectacle kit according to claim 1 wherein the side arms are provided with folds to assist in their assembly.

16. A spectacle kit according to claim 1 wherein the side arms are manufactured from rigid plastic material.

17. A spectacle kit according to claim 1 wherein the side arms each include a hinge.

18. A spectacle kit according to claim 17 wherein each hinge comprises a notch so as to enable the side arms to be folded toward one another during use of the spectacles.

19. A spectacle kit according to claim 1 wherein the side arms are curved so as to be suitable for gripping the sides of a wearer's head.

20. A spectacle kit according to claim 1 wherein the spectacle kit parts are manufactured from the same sheet material and removably attached to a waste portion of such sheet material such that each kit part is removable therefrom.

21. A spectacle kit according to claim 1 wherein the kit further comprises a nose bridge element formed to be removably attachable to the lenses nose bridge portion.

22. A spectacle kit according to claim 21 wherein the nose bridge element is manufactured from rigid plastic material.

23. A pair of spectacles comprising:
a pair of lenses made from flexible material and a pair of side arms, each lens having an upper arm and a lower arm disposed at its outer edge, said arms at each edge overlapping one another such that each lens is provided with a curved portion wherein each side arm includes a slot suitable for receiving a corresponding end portion of the pair of flexible lenses.

* * * * *